(12) United States Patent
Lev

(10) Patent No.: US 9,387,493 B2
(45) Date of Patent: Jul. 12, 2016

(54) SHOWERHEAD WITH TOUCH BASED MULTIMODAL RECHARGEABLE BATTERY OPERATION

(71) Applicant: SIDUS TECHNOLOGIES, INC., West Bloomfield, MI (US)

(72) Inventor: Mordechai Lev, West Bloomfield, MI (US)

(73) Assignee: SIDUS TECHNOLOGIES, INC., West Bloomfield, MI (US)

( * ) Notice: Subject to any disclaimer, the term of this patent is extended or adjusted under 35 U.S.C. 154(b) by 52 days.

(21) Appl. No.: 13/967,103

(22) Filed: Aug. 14, 2013

(65) Prior Publication Data

US 2014/0138456 A1    May 22, 2014

Related U.S. Application Data

(63) Continuation-in-part of application No. 13/455,715, filed on Apr. 25, 2012, now abandoned, and a continuation-in-part of application No. PCT/US2010/025333, filed on Feb. 25, 2010, and a (Continued)

(51) Int. Cl.
*A62C 31/02* (2006.01)
*B05B 1/16* (2006.01)
(Continued)

(52) U.S. Cl.
CPC ............ *B05B 1/1636* (2013.01); *H04N 1/0044* (2013.01); *H04N 1/00204* (2013.01);
(Continued)

(58) Field of Classification Search
CPC .. B05B 1/1627; B05B 1/1633; B05B 1/1681; A01G 25/16; A01G 25/165

USPC ............ 239/394, 67–70, 390, 392, 393, 395, 239/436, 437
See application file for complete search history.

(56) References Cited

U.S. PATENT DOCUMENTS 2,992,779 A    7/1961 James et al. .................. 239/226
4,867,189 A    9/1989 Moineau ......................... 137/1
(Continued)

FOREIGN PATENT DOCUMENTS

JP    2001-314467 A    11/2001
KP    20-1989-0001377    4/1989
(Continued)

OTHER PUBLICATIONS

International Search Report and Written Opinion PCT/US2010/205333 dated Nov. 25, 2010.

*Primary Examiner* — Davis Hwu
(74) *Attorney, Agent, or Firm* — Avery N. Goldstein; Blue Filament Law PLLC

(57) ABSTRACT

A showerhead for personal hygiene is provided that includes a valve actuator that is powered mechanically or electrically to provide variation in spray pattern, variation in water flow, or a combination thereof upon a user initiating valve actuator operation. A power supply, with a recharge capability for the power source, is provided of a battery-electric motor or a spring, the power supply is in mechanical communication with the actuator. A user interface includes buttons corresponding to different multimodal operational programs for the showerhead. A user programmable keypad allowing selection between different spray modes, flow rates and a combination thereof is provided within an integral showerhead housing or a remote control. A user is able to change modes without intervening manual manipulation between modes; as a result an enhanced massage experience is provided. A timed shower period, reduced water flow patterns, or a combination thereof is also provided to save water.

17 Claims, 9 Drawing Sheets

Related U.S. Application Data continuation-in-part of application No. 12/424,231, filed on Apr. 15, 2009, now Pat. No. 8,061,631.

(60) Provisional application No. 61/682,993, filed on Aug. 14, 2012, provisional application No. 61/478,765, filed on Apr. 25, 2011, provisional application No. 61/045,040, filed on Apr. 15, 2008.

(51) Int. Cl.
*H04N 1/32* (2006.01)
*H04N 1/00* (2006.01)

(52) U.S. Cl.
CPC ....... *H04N1/00244* (2013.01); *H04N 1/00278* (2013.01); *H04N 1/00419* (2013.01); *H04N 1/00472* (2013.01); *H04N 1/00973* (2013.01); *H04N 1/32112* (2013.01); *H04N 1/00145* (2013.01); *H04N 1/00164* (2013.01); *H04N 1/00183* (2013.01); *H04N 2201/0039* (2013.01); *H04N 2201/3256* (2013.01); *H04N 2201/3259* (2013.01); *H04N 2201/3263* (2013.01); *H04N 2201/3264* (2013.01); *H04N 2201/3266* (2013.01); *H04N 2201/3273* (2013.01); *H04N 2201/3278* (2013.01)

(56) References Cited

U.S. PATENT DOCUMENTS

| | | | |
|---|---|---|---|
| 5,199,639 A | | 4/1993 | Kobayashi et al. |
| 5,427,350 A | * | 6/1995 | Rinkewich ................. 251/30.01 |
| 5,542,909 A | * | 8/1996 | Camp ............................ 601/160 |
| 5,699,833 A | * | 12/1997 | Tsataros ................. E03C 1/057 |
| | | | 137/624.11 |
| 5,853,130 A | | 12/1998 | Ellsworth |
| 5,862,985 A | | 1/1999 | Neibrook et al. .............. 239/99 |
| 6,145,755 A | | 11/2000 | Feltz .................................. 239/1 |
| 6,186,413 B1 | | 2/2001 | Lawson ....................... 239/205 |
| 6,622,933 B1 | * | 9/2003 | Young et al. .................... 239/66 |
| 7,613,855 B2 | | 11/2009 | Phillips et al. ................. 710/72 |
| 7,878,417 B2 | | 2/2011 | Brown et al. ............... 236/93 A |
| 8,061,631 B2 | * | 11/2011 | Lev .............................. 239/394 |
| 2006/0255176 A1 | | 11/2006 | Yeiser |

FOREIGN PATENT DOCUMENTS

| KP | 10-2009-0122538 | 12/2009 |
|---|---|---|
| KR | 20-0335108 | 12/2003 |

* cited by examiner

SHOWERHEAD WITH TOUCH BASED MULTIMODAL RECHARGEABLE BATTERY OPERATION

CROSS-REFERENCE TO RELATED APPLICATIONS

This application claims priority benefit of U.S. Provisional application No. 61/682,993 filed Aug. 14, 2012; and is a continuation in part of U.S. application Ser. 13/455,715, Apr. 25, 2012 which in turn claims priority benefit of U.S. Provisional application No. 61/478,765 filed Apr. 25, 2011; as well as PCT application No. PCT/US2010/025333 filed Feb. 25, 2010; and is a continuation in part of U.S. application Ser. No. 12/424,231, filed Apr. 15, 2009 which in turn claims priority benefit of U.S. Provisional application No. 61/045,040 filed Apr. 15, 2008; the contents of which are hereby incorporated by reference.

FIELD OF THE INVENTION

The present invention in general relates to a personal hygiene showerhead, and in particular to a showerhead offering multiple modes of operation with a controller having a mechanical or electrical power source to control effluent properties within a mode of operation with touch activation of the controller via contact with showerhead and recharge capability for the power source.

BACKGROUND OF THE INVENTION

Conventional showerheads are characterized by a valve controlling water flow to the showerhead and often a mode selector that allows a user to adjust the effluent spray pattern from the showerhead. While numerous structures have been developed to vary the showerhead aperture dimensions and/or number to modify the spray pattern, these showerheads have in common the requirement of manual actuation of a valve or apertured disc to modify showerhead effluent spray pattern. As a result, only a single spray pattern is experienced before a manual adjustment is required to sample another spray pattern. The requirement of user intervention to modify the spray pattern practically results in a less beneficial therapeutic bather experience, as well as excessive water usage through a water massage spray sequence not being followed with adequate temporal control.

While regulations exist as to maximal personal hygiene showerhead flow rates, the limitation of showerhead flow rate has no impact on the duration of shower usage. While timed showerhead flow valves are in widespread use in the institutional setting, such timed showerheads likewise fail to afford more than a binary action (off-on) between manual manipulations.

Thus, there exists a need for a showerhead providing multiple spray patterns without resort to a manual manipulation between each spray pattern. There also exists a need for a showerhead providing variation in flow rate without manual manipulation between the flow rates. There also exists a need for such a showerhead having a recharge capability with limited manipulation of the battery power source.

SUMMARY OF THE INVENTION

A showerhead for personal hygiene is provided that includes a housing having a spray face extending therefrom. A cavity in the housing is in fluid communication with a water supply and the spray face by way of nozzle apertures. A spray selector controls fluid flow between the cavity and each of the nozzle apertures. A power supply, with a recharge capability for the power source, is provided for a battery-electric motor or a spring, the power supply is in mechanical communication with an actuator. The actuator operates to move the selector. A user touch interface provides a user with selective movement of the selector to sequentially provide multiple spray patterns from the spray face. The user interface is an electrically conductive portion of the housing or the spray face.

A process of operating a hygienic showerhead is also provided that includes flowing water from a water supply through the hygienic showerhead to a spray face. By touching a housing or spray face of the hygienic showerhead a first spray function is changed through an actuator powered by a battery. The battery is recharged through the flowing of the water through the hygienic showerhead to operate the hygienic showerhead.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE PREFERRED EMBODIMENTS

The present invention has utility as a showerhead for personal hygiene. An inventive showerhead has a valve actuator that is powered mechanically or electrically to provide variation in spray pattern, variation in water flow, or a combination thereof upon a user initiating valve actuator operation. A user interface includes one or more user interface buttons each corresponding to a different multimodal operational program for the showerhead. A user programmable keypad allowing a user to select between different spray modes, flow rates and a combination thereof is also provided within an integral showerhead housing or a remote control. A user is able to change modes without intervening manual manipulation between modes; as a result an enhanced massage experience is provided. A timed shower period, reduced water flow patterns, or a combination thereof is also provided to save water. The internal mechanism is similar to the one mentioned in the multimodal application, PCT/US2010/025333 published as WO2011/106000. The innovation of the present invention is related to further simplification of selecting the function the user would like to experience. While in the multimodal application WO2011/106000 calls out a series of electronics switches, which the user could press to change function; in the present invention, touching the housing with bare skin i.e. finger tapping changes the spray function. As these showerheads require a power source such as a battery or batteries, the present invention provides a turbine powered by shower operation to recharge the power source that is passive with respect to human intervention and instead battery recharge occurs with usage of the inventive multimodal showerhead.

In a particular embodiment of the present invention, the housing or the spray face is made of conductive material illustratively including a metal, such as aluminum, brass, or corrosion resistant plated steel; conductive plastic; metallized coating plated plastics; conductive oxide coated materials where the coating is illustratively indium tin oxide (ITO), tin oxyfluorides or aluminum zinc oxide (AZO). By tapping on the conductive surface of the housing, the electronic circuitry detects an instant change in resistance and changes the function to the next function. Each tap moves the mechanism by one step thus moving the mechanism multiple steps requires multiple tappings. It is appreciated that a touch activation inventive showerhead is operative alone with or in an inventive device including electronics switches. Alternatively, the mechanism advances based on duration of touch contact with, for example, each second of contact constituting one step of mode mechanism movement. Thus, in this example, a three second contact with the conductive housing or portion thereof moves the mechanism three steps.

Figure 1:
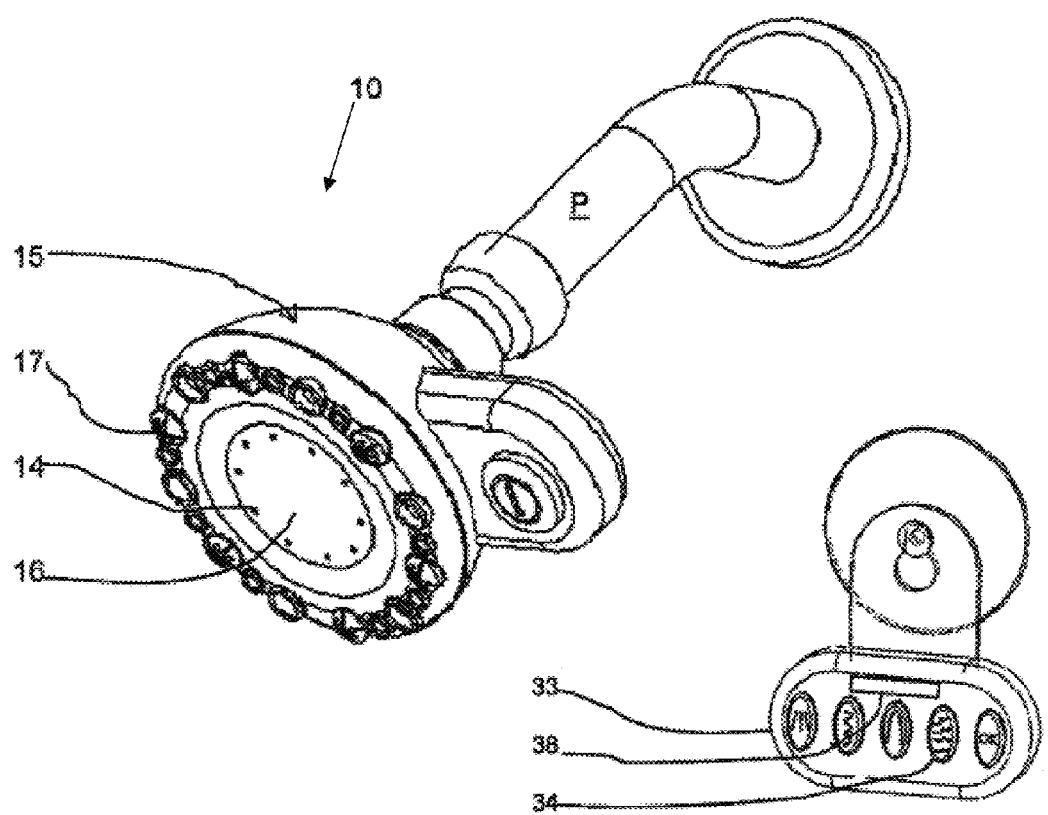
FIG. 1 is a perspective view of an inventive showerhead with an inset depicting a remote control therefor that communicates user interface commands to the showerhead proper.
Figure 2:
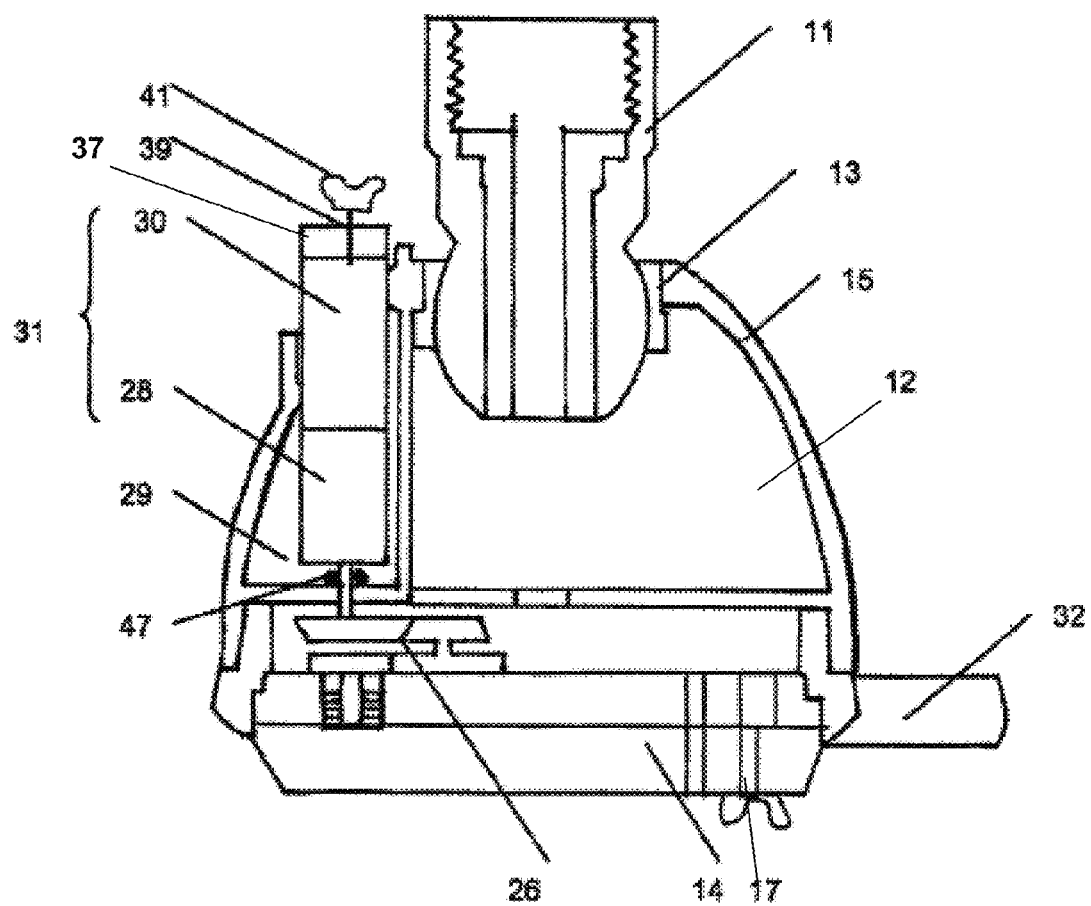
FIG. 2 is a transverse cross-sectional view of the showerhead of FIG. 1.

Referring now to FIGS. 1 and 2, an inventive showerhead is shown generally at 10. The showerhead 10 is coupled to a pressurized water supply pipe P. The showerhead 10 has a ball joint 11 extending to a mixing cavity 12 in fluid communication with nozzle apertures 14. A seal 13 contains water with the cavity 12 defined by the housing 15. The nozzle apertures 14 terminate in a spray face 16. The spray face 16 is appreciated to be a wall mounted spray head or extend by way of a flexible tube water supply pipe P to a handheld spray head. A valve actuator 18 is mechanically coupled to a conventional rotary spray pattern selector 20. A spray pattern selector 20 rotates to provide selective fluid communication between water within the pipe P and a given nozzle aperture 17. It is appreciated that the spray face 16 can be planar, convex or concave and need not be displaced in height relative to apertures 17. With a large number of aperture nozzles 17 being in fluid communication a wide, low pressure spray pattern is provided relative to when a smaller number of like sized nozzle apertures are in fluid communication with the water supply. It is appreciated that a selector 20 also varies the shape of as well as the overall nozzle area. A large nozzle area is associated with a low pressure flow while a smaller nozzle area corresponds to a comparatively higher pressure flow pattern. A spray face 16 and a selector 20 are readily formed of materials conventional to the art illustratively including thermoplastics, thermoset resins and non-corroding metals such as brass alloys, aluminum and stainless steel.

An inventive valve actuator 18 has a coupling to mechanically engage the rotary selector 20. The gear train 26 is coupled to a motor 28 that when energized displaces the gear train 26 and in turn moves the selector 20 so as to modify flow pattern and/or flow rate from the showerhead 10. The motor 28 is located within motor cavity 29 of the housing 15. The motor 28 is energized by a battery 30 collectively forming a power supply 31. An alternative power supply 31 is either a battery or a spring storing kinetic energy and includes a manual crankshaft 39 with a manually turnable wing nut 41 to facilitate cranking. The power supply cavity 29 is sealed with a door 37. An O-ring 47 prevents water entry into the motor compartment 29.

Figure 3A:
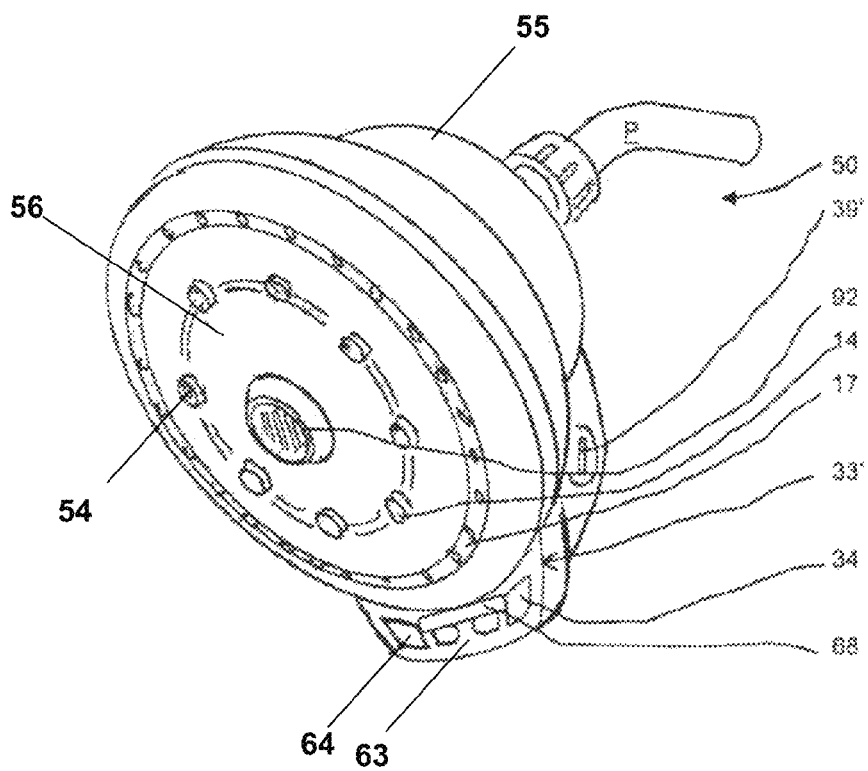
FIG. 3A is a perspective front view of an inventive showerhead with an integrated user interface.
Figure 3B:
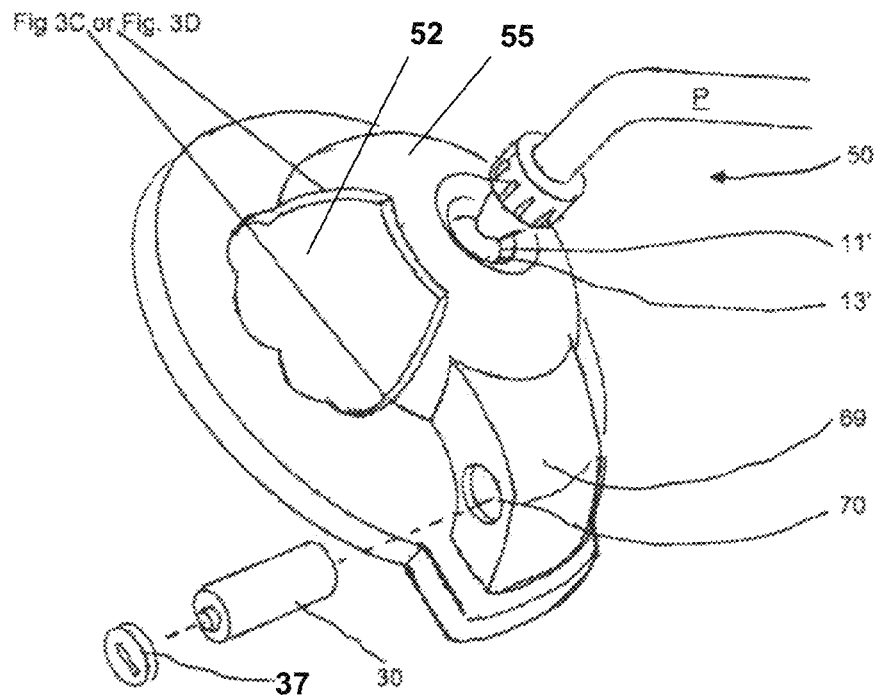
FIG. 3B is a partial cutaway exploded rear perspective view of the showerhead of FIG. 3A with an expanded view, partial cutaway of an inset provided in alternate embodiments in FIGS. 3C and 3D.
Figure 3C:
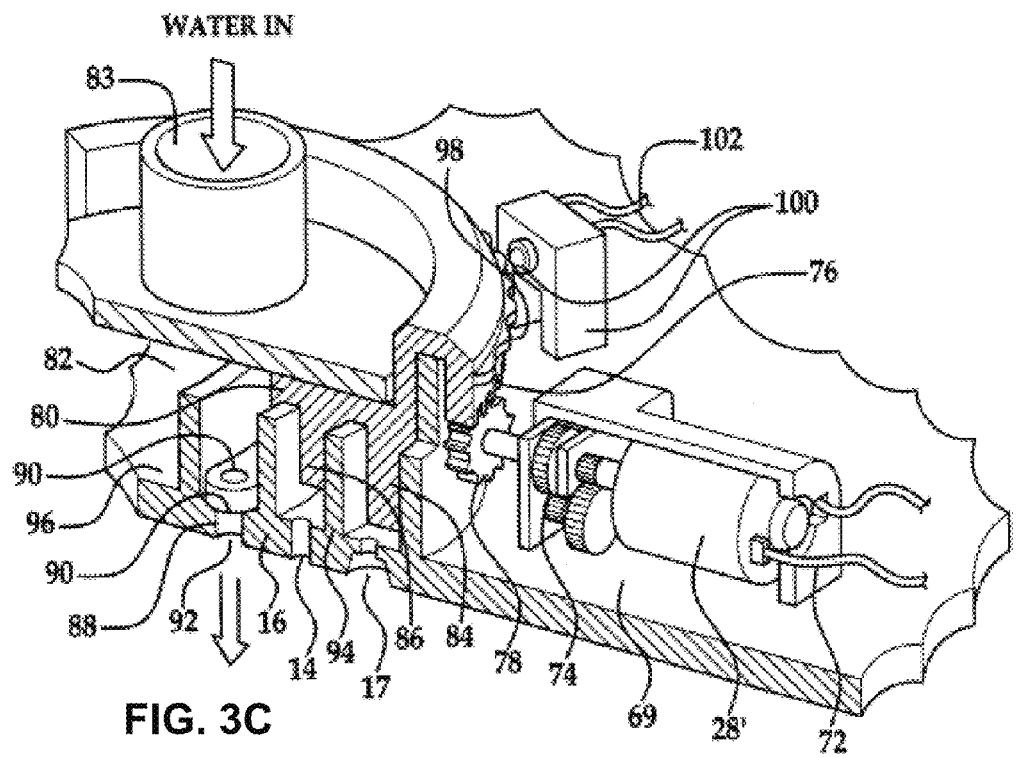
FIG. 3C is a partial cutaway view of an inventive showerhead mechanism operating with a cam system for mode control.
Figure 3D:
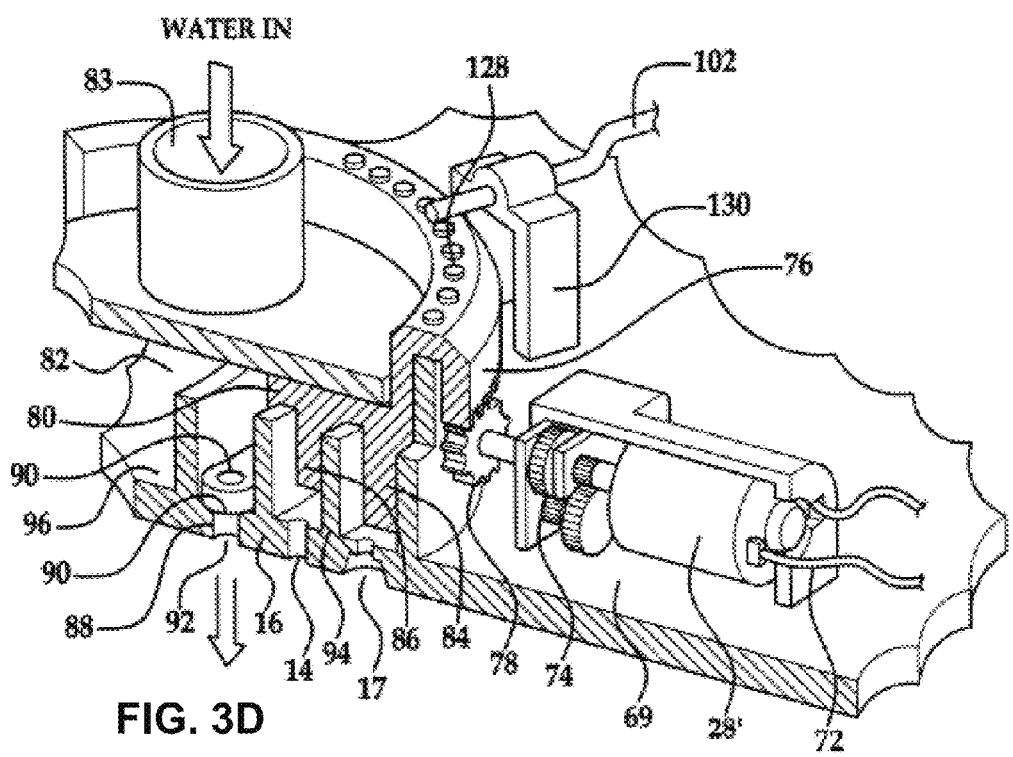
FIG. 3D is a partial cutaway view of an inventive showerhead mechanism operating with a magnet system for mode control.

The power supply 31 provides rotary movement of the selector 20 through intermittent movement, a cam system or a magnetic system, the latter depicted in greater detail in FIGS. 3C and 3D, respectively.

The battery 30 is either a disposable button type, alkaline battery, or a rechargeable battery. An ultra capacitor is contemplated as an alternative to a rechargeable battery. A battery charger accessory is contemplated to charge a second battery for exchange while a first battery is depleted of electrical charge through use in an inventive showerhead 10 or 50. In instances when the battery 30 lacks a charge sufficient to operate the selector 20, or a spring power supply 31 is unwound, an inventive showerhead operates as a conventional showerhead.

In instances when the battery 30 is present as a power source, an inventive showerhead 10 optionally also includes a printed circuit board 32 capable of storing multiple mode spray pattern and/or flow rate programs for the operation of the showerhead. A user interface 33 includes one or more buttons 34 to access pre-programmed modes and optionally a display 38 to allow a user to program a custom multimode operational program for the showerhead 10. While the interface 33 is depicted as a remote control communicative to the board 32 by way of infrared or radio frequency communication, it is appreciated that an interface 33 is readily formed with an insulated electrical wire extending between the board 32 and the interface 33 and communicating user mode preferences.

A selector 20 changes the mode of water flow delivery from an inventive showerhead. By way of example, a pre-programmed relaxation program provides a sixty second soft spray followed by thirty second high pressure flow, followed by sixty seconds of soft aeration spray. It is appreciated that the duration and order of these modes are readily changed. A pre-programmed energizing program may alternate full spray mode with massage function modes. It is appreciated that a mode also is optionally provided that delivers water at a reduced rate of less than 2.5 gallons per minute. The pre-programmed set of modes includes an optional pause mode to not only save water, but afford a user an opportunity to apply cleanser. At the end of the program, the shower flow either remains in constant spray mode or shuts off water flow from the spray head.

Referring now to FIGS. 3A-3D, an inventive showerhead is shown generally at 50. The showerhead 50 has a ball joint 11' extending to a cavity 52 in fluid communication with nozzle apertures 54. A seal 13' contains water within the cavity 52 defined by the housing 55. The nozzle apertures 54 terminate in a spray face 56. The ball joint 11' is joined to water supply pipe P or to a flexible tube water supply pipe P to form a handheld spray head. Housing 55 includes a motor compartment 69 which forms a watertight space upon a door 39' engaging an aperture 70 therein. The aperture 70 is sized to receive a battery 30.

The showerhead 50 has a user interface 63 that includes one or more buttons 64 and optionally a display 68 to allow a user to program a custom multimodal operational program or select from a number of preselected programs available with the inventive showerhead 50. By way of example, one button corresponds to the pre-programmed relaxation program while another for example corresponds to the pre-programmed energizing program detailed above. The display 68 can be by way of example a liquid crystal display, the display 68 deriving power from the battery 30. The circuitry (not shown) is provided intermediate and in electrical communication between the battery 30 and display 68 and preferably also intermediate between the battery 30 and an electric motor 28'.

FIG. 3C represents an expanded partial cutaway of the working components found within the housing 55. For visual clarity, a motorized shower mechanism provided in FIG. 3C depicts a single cam track and a single microswitch. A motor 28 is connected to wires 72 that extend to electrical circuitry (not shown). The circuitry provides electrical input modification to changes in voltage being provided to the motor 28' and includes control functions to translate user activation of a button 34 into an operational program. In the event that a display 68 is present, memory is provided that selectively displays appropriate icons and characters therein. Optionally, the electric circuitry includes read-write memory to accept user input programming. The electric motor is contained within watertight motor compartment 69 and is enmeshed with a gear train 74. The gear train 74 transmits rotational energy from the motor 28' to a selector 20 having a gear rack 76 also enmeshed with the gear train 74 by way of a drive gear 78. As the gear rack 76 rotates the mechanical power input from the motor 28' via the gear train 74 and gear 78, the selector 20 has aperture restricting structure 80 extending into a mixing cavity receiving water via aperture 83. The aperture restricting structure 80 optionally includes multiple teeth 84 and 86 concentrically displaced to overlap occasionally nozzle apertures 14 and 17, respectively. As shown in FIG. 3C, a third tooth 88 is shown having a hole 90 therethrough that changes the flow pattern through a central nozzle aperture 92 in the spray face 16. Optionally, ribs 94 extend from the back surface 96 of spray face 16 and into the mixing cavity 82. The ribs 94 provide mechanical support for the aperture restricting structure 80.

A cam track 98 associated with the selector 20 provides a series of points that vary in radial diameter. While the portion of cam track 98 depicted in FIG. 3C shows a uniform sinusoidal undulation, it is appreciated that the variations along the cam track 98 can be discontinuous, such as forming a square wave, and need not be of uniform shape or dimension. Additionally, it is appreciated that several spaced cam tracks such as cam track 98 are provided around the diameter of the selector 20 with each track denoting a different program. A microswitch 100 upon detecting a given feature on cam track 98 sends a signal to the motor 28 that deactivates the motor thereby creating effluent from the spray face in a different spray mode. The signal from the microswitch 100 is communicated via electrically insulated wire 102 either directly to the motor 28' or through circuitry. As a result, a user depressing a button 34 on the control pad 33' can initiate a given program including at least two different spray output modes. In instances when there are multiple cam tracks around the periphery of the selector 20, preferably each such cam track has a devoted microswitch that is activated to control motor 28' when a button 34 on the control pad 33' is activated that corresponds to the given cam track.

Referring now to FIG. 3D, a motorized shower mechanism is provided based on a read switch and at least two magnets associated with the selector 20. With respect to FIG. 3D, where like numerals are used with respect to this mechanism, the meaning associated with the reference numeral is intended to be that associated with the reference numeral in the previously described figures. FIG. 3D is otherwise the same as FIG. 3C except the mechanical cam tracks of FIG. 3C (as shown in a single representative embodiment with respect to reference numeral 98) have been replaced with a radial grouping of magnets 128. While the radial group of magnets 128 depicted in FIG. 3D. A read switch 130 senses the position of magnet from within the radial group of magnets 128 and sends a signal to the motor 28', preferably by way of circuitry to modify the operation of motor 128 so as to modify motor operation to activate, deactivate, vary speed or a combination thereof so as to effectively change the shower mode through rotary change of the selector 20. The signal from the read switch 130 to the motor 28' is conveyed via wires 102.

Figure 4:
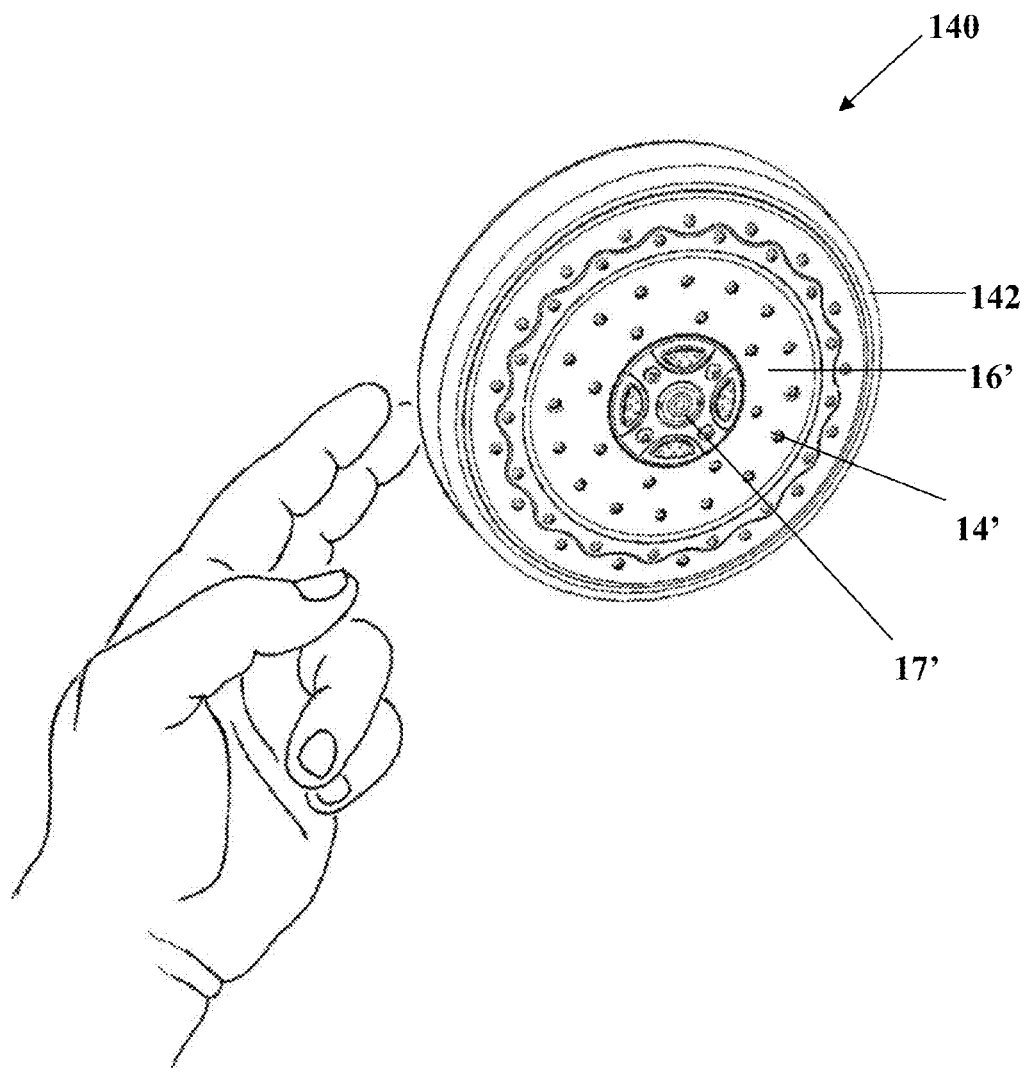
FIG. 4 is a perspective view of a skin contact activation of an inventive showerhead mechanism.
Figure 5:
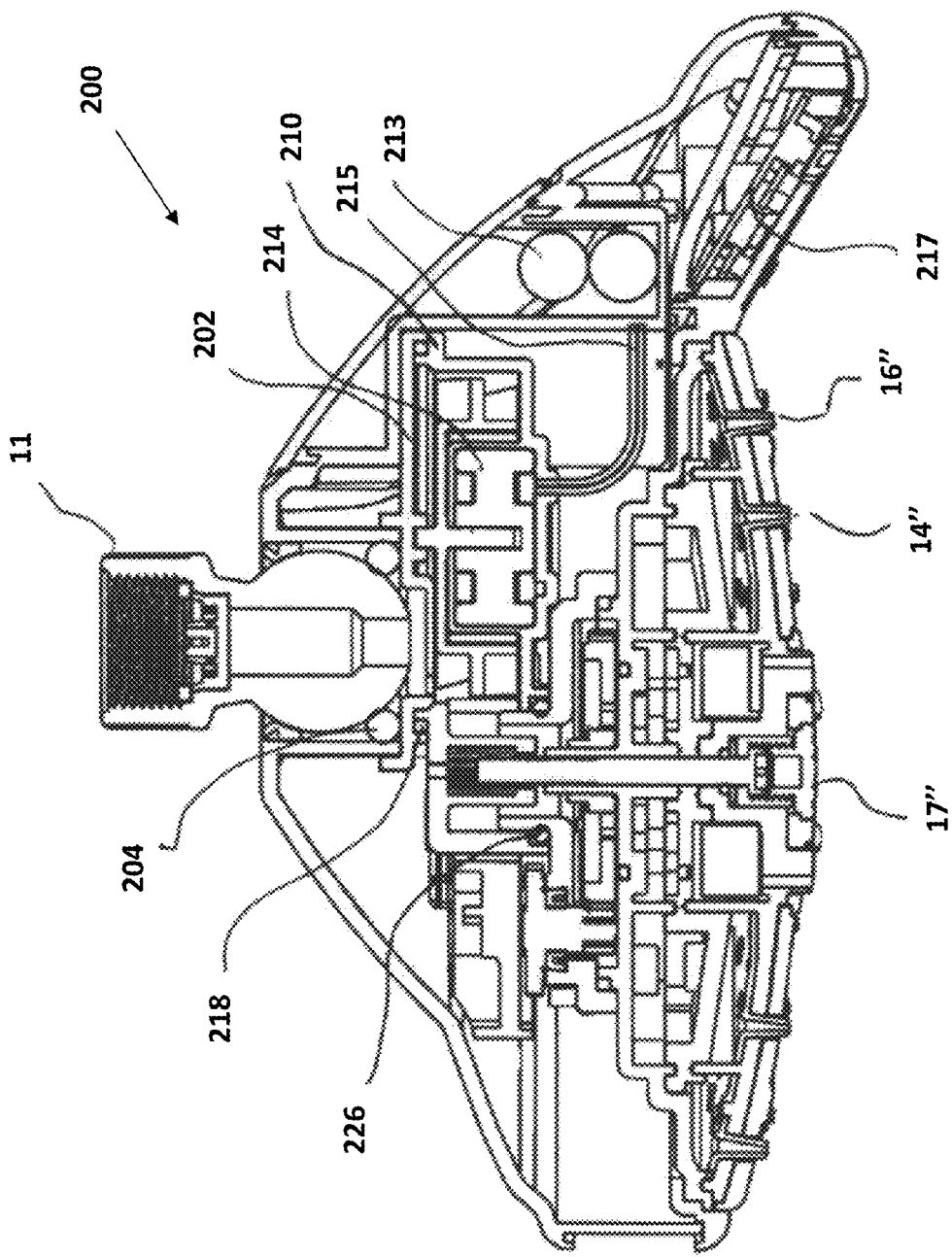
FIG. 5 is a longitudinal cross-sectional view of a water powered electrical power source rechargeable inventive showerhead.
Figure 6:
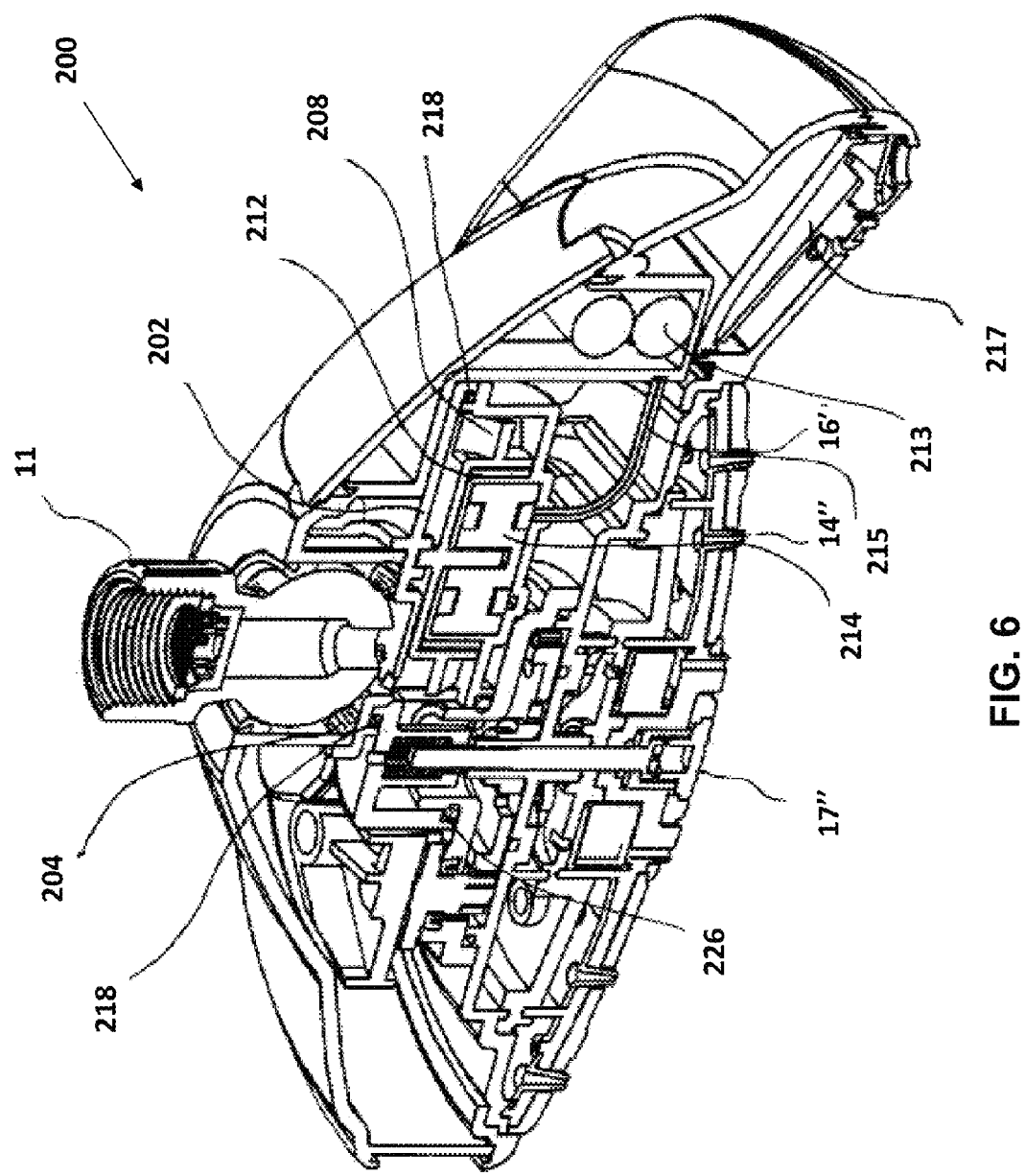
FIG. 6 is a perspective view of the view depicted in FIG. 5.
Figure 7:
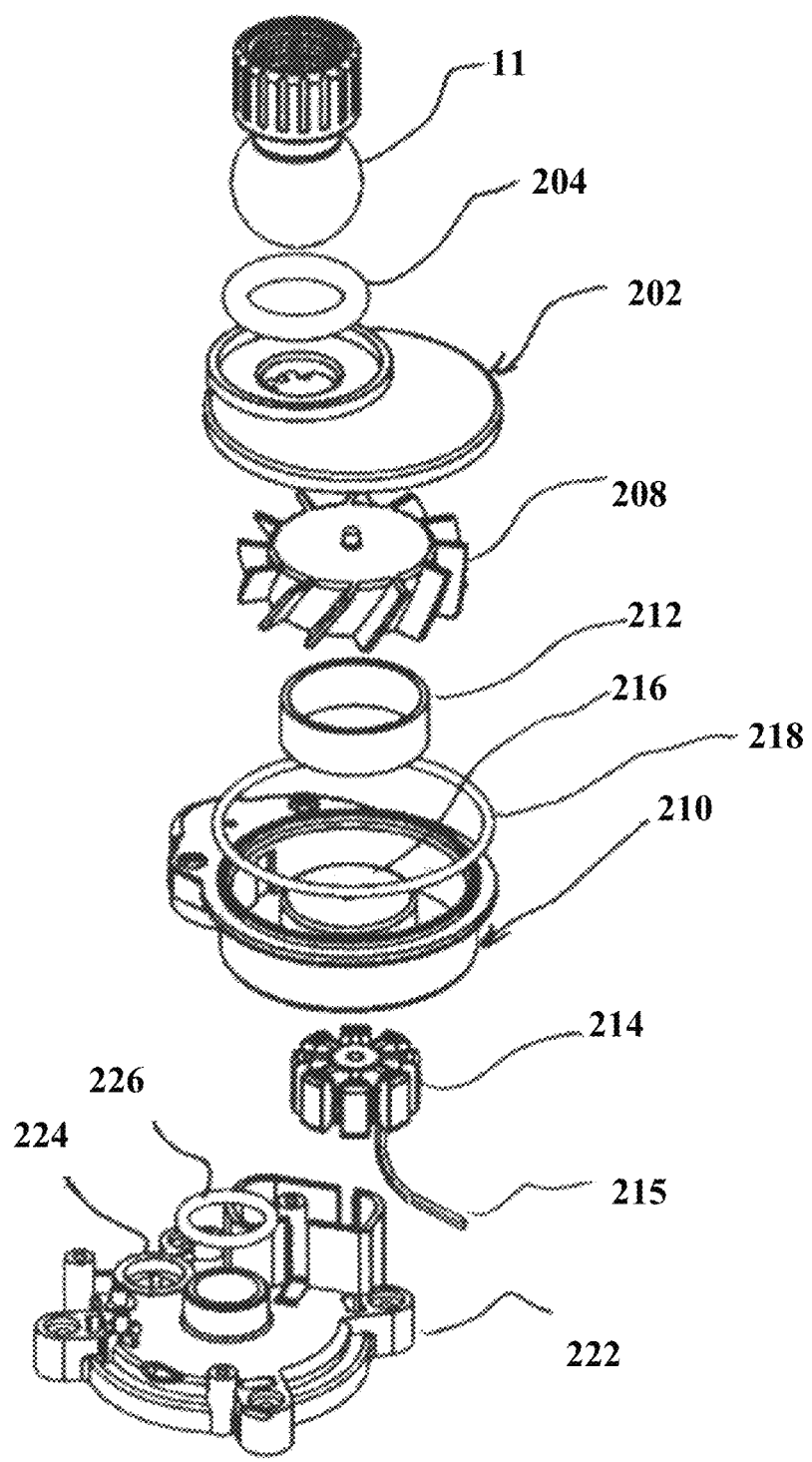
FIG. 7 is an exploded view portions of the showerhead of FIG. 5 operative in electrical power source recharge.
Figure 8:
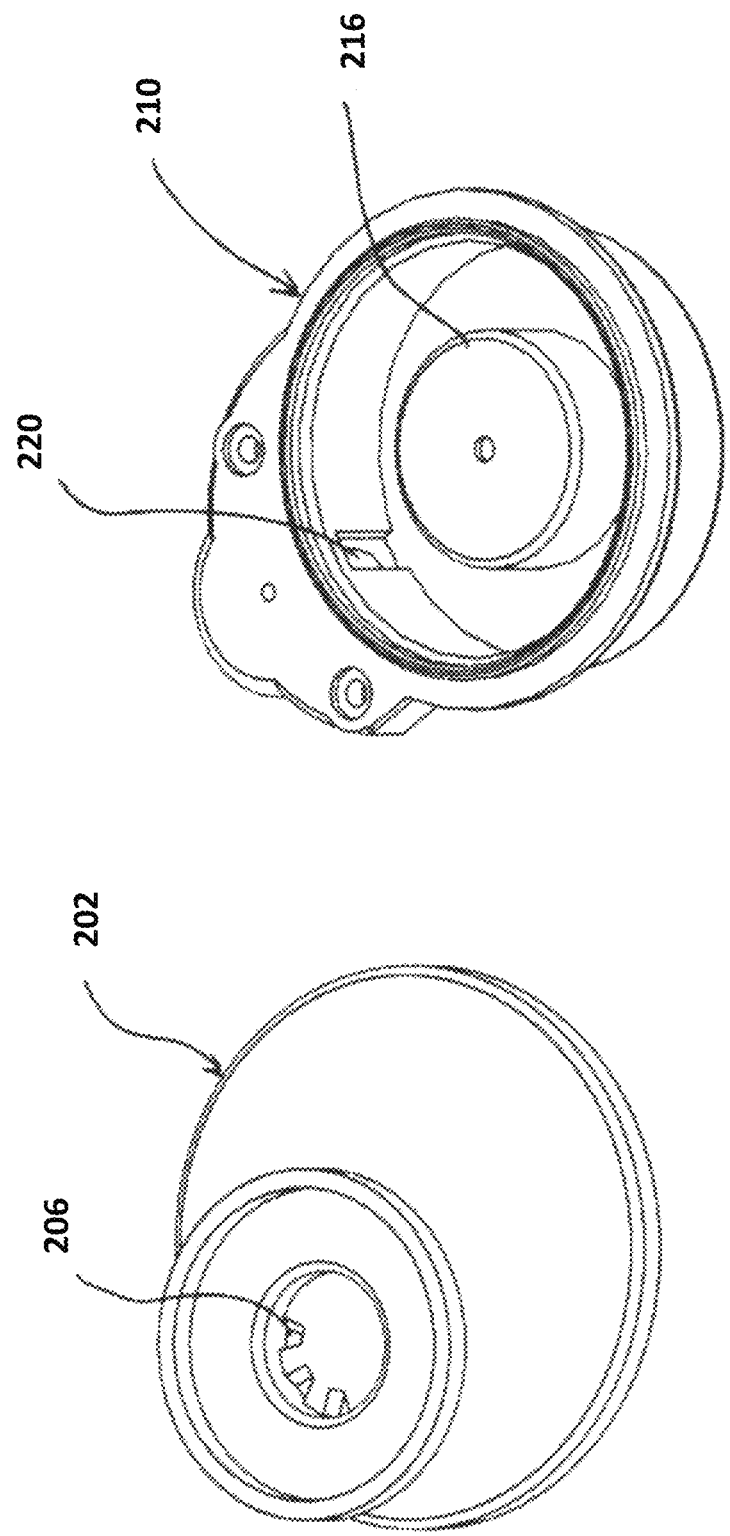
FIG. 8 is an exploded view of the turbine chamber and the turbine chamber top displaced from one another.

FIG. 4 depicts a user hand contacting an inventive showerhead with a touch control, shown generally at 140. While the showerhead 140 has a different pattern of apertures 17' and nozzle apertures 14' in spray face 16' relative to that depicted in the aforementioned figures, the operation of these features and the components within an inventive showerhead as shown with respect to FIGS. 2, 3A-3D are operative in this embodiment. It is appreciated that a touch activation inventive showerhead 140 as the sole means of changing operational modes or alternatively is also present with electronics switches interface and buttons shown in the aforementioned figures with respect to reference numerals 33, 33', and 34. The showerhead 140 has an electrically conductive portion 142 as part of the housing, spray face, or both. The electrically conductive portion 142 is formed of conductive material illustratively including a metal, such as aluminum, brass, or corrosion resistant plated steel; conductive plastic; metallized coating plated plastics; conductive oxide coated materials where the coating is illustratively indium tin oxide (ITO), tin oxyfluorides or AZO. The electrically conductive portion 142 is in electrical communication with a circuit board 32 as shown in FIG. 2. By tapping on the conductive portion 142, the electronic circuitry 32 changes the showerhead flow mode to the next mode. In some embodiments, each tap of portion 142 moves the mechanism by one step thus moving the mechanism multiple steps requires multiple taps on portion 142; while in other embodiments, tap duration in a preselected time increment moves the mechanism one step for each time increment of contact.

FIGS. 5-8 depict a mechanism that is amenable to inclusion in a multimodal showerhead as detailed herein, where like numerals have the meanings ascribed thereto with respect to the aforementioned figures, FIGS. 1-4, inclusive. An inventive water flow induced battery regenerative showerhead is shown generally at 200. A ball joint 11 provides fluid communication between the water supply and the volume of the showerhead 200. The ball joint 11 forms a water tight seal with a turbine chamber top 202. The ball joint 11 and the top 202 simultaneously engage an O-ring 204 to form a watertight seal. The top 202 has a water inlet 206. In a specific embodiment shown in FIG. 8, the inlet 206 is tangential and servers to facilitate the spinning of a turbine 208 within a turbine chamber 210. A magnet 212 circumferentially surrounds a bobbin with current induction coils 214, the bobbin in electrical communication with the electrical power source 213 by way of wires 215. The magnet 212 being induced to rotate by water flow through the inlet 206 and around the turbine 208. The bobbin 214 residing in a water-proof recess 216 in the chamber 210. A second O-ring 218 forms a watertight seal between the top 202 and the chamber 210. It is appreciated that the recess is defined by chamber wall material that is permeable to magnet flux created by the rotation of magnet 212 so as to induce current generation in the bobbin 214. It should also be appreciated that it is the relative movement of the magnet 208 and bobbin 214 that creates a charge for recharge of the electrical power source 213 and as such a bobbin 214 moving relative to a stationary magnet 212 is also operative herein. The components of the top 202, turbine 208, and chamber 210 are readily formed of materials conventional to the art including thermoplastics, thermoset resins, stainless steel, brass, and combinations thereof. The power source 213 is readily selected from among a rechargeable battery, or an ultracapacitor. In certain inventive embodiments, circuitry 217 is provided to condition the power generated by the bobbin 212 to more efficiently charge the power source 213.

The water upon rotating the turbine 208 exits from the chamber 210 by way of an aperture 220. The aperture forms a water tight seal with the multimodal rotatable shower face portion 222 with a third O-ring 226 that collectively form a water tight isolation of the bobbin 214. With water entering portion 222, mode selection and the exit of water through spray faces 14", 16", 17", or a combination thereof through resort to a mechanism as detailed with respect to FIG. 3C or 3D, where redundant components between FIG. 3C or 3D and FIGS. 5-8 have been removed for visual clarity.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A showerhead for personal hygiene comprising:
a housing;
a spray face extending from said housing;
a cavity in said housing and in fluid communication with a water supply and said spray face by way of a plurality of nozzle apertures;
a spray selector controlling fluid flow between said cavity and each of the plurality of nozzle apertures;
a power supply of an electric motor powered by a power source, said electric motor contained within watertight motor compartment of said housing;
an actuator providing mechanical communication between said power supply and said selector to move said selector;
a turbine powered fluid communication with the water supply, said turbine inducing a current between a relative movement of a magnet to a bobbin, the current flowing to recharge said power source;
a user touch interface for providing a user with selective movement of said selector to sequentially provide multiple spray patterns from said spray face, said user interface being an electrically conductive portion of said housing or said spray face; and
wherein said electrically conductive portion is in electrical communication with a circuit board with electronic circuitry that changes between the multiple spray patterns in response to tapping on said conductive portion.

2. The showerhead of claim 1 further comprising a circuit in electrical communication between said bobbin and said power source to condition the current prior to exposure to said power source.

3. The showerhead of claim 1 wherein said power source is a battery or a plurality of batteries.

4. The showerhead of claim 1 wherein said magnet rotates about a stationary bobbin with water flow from the water supply.

5. The showerhead of claim 1 wherein said spray selector rotates relative to said spray face.

6. The showerhead of claim 1 further comprising a gear train intermediate between said power supply and said spray selector.

7. The showerhead of claim 1 further comprising a turbine chamber in which said turbine rotates, said turbine chamber having a water tight recess in which said bobbin resides.

8. A process of operating a hygienic showerhead comprising:
flowing water from a water supply through showerhead for personal hygiene of claim 1 to a spray face;
touching an electrically conductive portion of a housing or the spray face of the hygienic showerhead to change a first spray function through an actuator powered by a battery via an electric motor contained within watertight motor compartment of said housing; and
recharging the battery through the flowing of the water through the hygienic showerhead to operate the hygienic showerhead.

9. The process of claim 8 wherein the battery is recharged by current generated by a relative movement of a magnet to a bobbin, the movement induced by the flowing of the water.

10. The process of claim 8 further comprising touching the housing or the spray face a second time to change the first spray function to a second spray function.

11. The showerhead of claim 1 wherein said electrically conductive portion is formed from a metal, said metal comprising at least one of aluminum, brass, or corrosion resistant plated steel.

12. The showerhead of claim 1 wherein said electrically conductive portion is formed from a conductive plastic, said conductive plastic comprising at least one of metallized coating plated plastics or conductive oxide coated materials.

13. The showerhead of claim 12 wherein the conductive plastic is coated with at least one of indium tin oxide (ITO), tin oxyfluorides, or aluminum-doped zinc oxide (AZO).

14. The showerhead of claim 1 wherein each tap of said electrically conductive portion moves said actuator by one step.

15. The showerhead of claim 1 wherein a tap duration on said electrically conductive portion in a preselected time increment moves said actuator one step for each time increment of contact of the tap duration.

16. The process of claim 8 wherein each tap of said electrically conductive portion moves said actuator by one step.

17. The process of claim 8 wherein a tap duration on said electrically conductive portion in a preselected time increment moves said actuator one step for each time increment of contact of the tap duration.

* * * * *